(12) United States Patent
Schwalm et al.

(10) Patent No.: US 8,415,437 B2
(45) Date of Patent: Apr. 9, 2013

(54) (METH)ACRYLATED MELAMINE FORMALDEHYDE RESINS

(75) Inventors: Reinhold Schwalm, Wachenheim (DE); Christine Roesch, Oppenheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/131,995

(22) PCT Filed: Aug. 2, 2010

(86) PCT No.: PCT/EP2010/061169
§ 371 (c)(1),
(2), (4) Date: May 31, 2011

(87) PCT Pub. No.: WO2011/015539
PCT Pub. Date: Feb. 10, 2011

(65) Prior Publication Data
US 2011/0230586 A1    Sep. 22, 2011

(30) Foreign Application Priority Data

Aug. 5, 2009 (EP) .................................... 09167273

(51) Int. Cl.
*C08F 283/00* (2006.01)
*C08F 277/00* (2006.01)
*C08F 271/02* (2006.01)
*C08F 271/00* (2006.01)

(52) U.S. Cl.
USPC ........... 525/518; 525/509; 525/519; 522/134; 522/135; 522/136; 522/144; 522/149; 522/151; 522/162; 522/166; 522/167; 522/173; 522/178

(58) Field of Classification Search ............. 522/134, 522/135, 136, 144, 149, 151, 162, 166, 167, 522/173, 178, 182; 525/50, 509, 518, 519
See application file for complete search history.

(56) References Cited

U.S. PATENT DOCUMENTS

| | | | | |
|---|---|---|---|---|
| 3,464,938 A | * | 9/1969 | Nordstrom | ..................... 525/159 |
| 4,266,053 A | | 5/1981 | Imanaka et al. | |
| 4,357,219 A | * | 11/1982 | Sattler | ............................. 522/92 |
| 4,409,077 A | * | 10/1983 | Sakiyama et al. | ............. 522/167 |
| 5,288,523 A | * | 2/1994 | Klaiber et al. | .............. 427/385.5 |
| 5,866,259 A | * | 2/1999 | Harris et al. | ................ 428/424.4 |
| 5,888,655 A | * | 3/1999 | Harris et al. | ................ 428/423.1 |
| 6,777,458 B1 | * | 8/2004 | Jaworek et al. | ..................... 522/1 |
| 7,164,037 B2 | | 1/2007 | Dietsche et al. | |
| 7,517,474 B2 | | 4/2009 | Wagner et al. | |
| 8,198,387 B2 | * | 6/2012 | Kawada et al. | ................ 526/261 |
| 2010/0291640 A1 | | 11/2010 | Stuermer et al. | |
| 2011/0213068 A1 | | 9/2011 | Schwalm et al. | |

FOREIGN PATENT DOCUMENTS

| | | |
|---|---|---|
| DE | 196 18 720 | 11/1996 |
| DE | 196 51 350 | 6/1998 |
| DE | 199 57 900 | 6/2001 |
| EP | 0 007 508 | 2/1980 |
| EP | 0 057 474 | 8/1982 |
| EP | 0 263 749 | 4/1988 |
| EP | 0 495 751 | 7/1992 |
| EP | 0 615 980 | 9/1994 |
| EP | 0 675 141 | 10/1995 |
| EP | 0 738 740 | 10/1996 |
| EP | 198 26 712 | 12/1999 |
| EP | 199 13 353 | 9/2000 |
| JP | 63 286426 | 11/1988 |
| JP | 2004122456 A * | 4/2004 |
| WO | 98 33761 | 8/1998 |
| WO | 2004 050888 | 6/2004 |
| WO | 2008 022922 | 2/2008 |
| WO | 2010 130608 | 11/2010 |

OTHER PUBLICATIONS

Giacobbe, T.J., et al., "Syntheses of Monomers from Hydroxyethyl Acrylate and Methylolmelamine Which Polymerize by Low Doses of Radiation," Macromolecules, vol. 4, No. 5, pp. 630-632, (Sep.-Oct. 1971).
International Search Report issued Dec. 6, 2010 in PCT/EP10/061169 filed Aug. 2, 2010.

* cited by examiner

*Primary Examiner* — Sanza McClendon
(74) *Attorney, Agent, or Firm* — Oblon, Spivak, McClelland, Maier & Neustadt, L.L.P.

(57) ABSTRACT

The present invention relates to melamine-formaldehyde resins bearing (meth)acrylic groups, to processes for preparing them, to their use, and to coating compositions comprising them.

9 Claims, No Drawings

# (METH)ACRYLATED MELAMINE FORMALDEHYDE RESINS

The present invention relates to melamine-formaldehyde resins bearing (meth)acrylic groups, to processes for preparing them, to their use, and to coating compositions comprising them.

Pigmented paints and transparent varnishes comprising or based on melamine-formaldehyde resins have been known for a number of decades.

Unplasticized melamine-formaldehyde resins serve, either on their own or in combination with further, chemically different crosslinkers, examples being blocked polyisocyanates, trisalkylcarbamoyltriazines (TACT) or epoxides, as a crosslinking component in binder mixtures. Curing of the film-forming constituents produces a coating which is resistant to chemical, mechanical, and weathering-induced influences. Plasticized melamine-formaldehyde resins may feature modifications with carbamate structures, blends with polyesters or alkyd resins, and/or precondensations with the latter. When used on flexible coating substrates lacking dimensional stability, unplasticized melamine-formaldehyde resins require external elastification in order for the coating not to tear; as a sole formulating constituent, the crosslinker forms only brittle networks.

Melamine-formaldehyde resins can be characterized according to application (molding compounds, glues, impregnating resins, coating materials), alkylating compounds (etherification with butanol, methanol, mixed etherification) or, as set out here, by the ratio of triazine to formaldehyde to etherifying alcohol:

1. fully to highly methylolated and fully alkylated to highly alkylated resins (HMMM grades)
2.1 partly methylolated and highly alkylated resins (high imino grades)
2.2. partly methylolated and partly alkylated resins (methylol grades)
3. resins with a low degree of methylolation (melamine-formaldehyde condensates)

The first major group of the fully etherified melamine-formaldehyde resins, in which the molar melamine:formaldehyde:alcohol incorporation ratio is theoretically 1:6:6, in practice generally 1:>5.5:>5.0, and usually 1:>5.5:>4.0, is distinguished by extremely good high-solids behavior (relatively low viscosity at high solids content). In this group of crosslinkers the free formaldehyde is readily reducible. At the present time it is possible to achieve a free formaldehyde content<0.3% by weight. The commercial products usually comprise methanol as the alcohol, although grades with mixed etherification, and fully butylated grades, are also known.

The fully etherified melamine-formaldehyde resins are employed in practice preferably in can coating and coil coating and for all coats of the automobile finish.

The low thermal reactivity under baking conditions, such as 20 minutes at 140° C., necessitates catalysis with strong acids for these fully etherified melamine-formaldehyde resins. This results in very rapid curing, and a homogeneous co-network as a result of transetherification with the binder, accompanied by the release of the etherifying alcohols. With this strong-acid catalysis, very short cure times are possible, as in the case of partly methylolated melamine-formaldehyde resins. Crosslinking may be accompanied by formaldehyde emission which goes well beyond the free formaldehyde and is due to the re-cleavage of methylol groups.

The second major group of the partly etherified melamine-formaldehyde resins, which in practice generally feature a molar melamine:formaldehyde:alcohol incorporation ratio of 1:3 to 5.4:2 to 4.3, is distinguished by a thermal reactivity which is significantly increased in comparison to the first group, without acid catalysis. The production of these crosslinkers is accompanied by self-condensation, leading to a higher viscosity (lower high-solids behavior) and making the removal of the free formaldehyde during distillation more difficult as a result. For these products a free formaldehyde content of 0.5% to 1.5% is standard, though there are also products having a free formaldehyde content of 0.3% to 3% by weight. Here again, methylated and butylated commercial products, and also grades with mixed etherification, are widespread. Etherification with other alkylating compounds is described in the literature, and the corresponding products are available as specialty products.

High-imino grades and methylol grades, each as a subgroup, both feature incomplete methylolation, i.e., molar formaldehyde incorporation ratios of less than 1:5.5. The high-imino grades differ from the methylol grades, however, in a high degree of alkylation, i.e., in the proportion of the etherified methylol groups as a fraction of the incorporated formaldehyde equivalents, which is usually up to 80%, whereas for the methylol grades it is generally <70%.

Applications for the partly methylolated melamine-formaldehyde resins extend across all fields of use, including combinations with HMMM grades, for adaptation of reactivity, where curing temperatures of 100 to 150° C. are required. Additional catalysis using weak acids is possible and is common practice.

Besides the reaction of the amino resin with the binder there is a substantially increased proportion of self-crosslinking on the part of the crosslinker. The consequence is reduced elasticity in the system as a whole, and this reduction must be compensated by an appropriate selection of the co-component. Set against this is the advantage of reduced total formaldehyde emission from the coatings produced from the system.

Finishes based on melamine-formaldehyde condensation resins are used in the automotive segment, for industrial coatings generally, but also for wood and plastic. The coating systems feature particular hardness, gloss, resistance to chemicals and to yellowing, and weather resistance.

The reaction of melamine-formaldehyde resins with polymers containing carbamate groups is known, as from EP 738740 or EP 675141, for example.

The copolymers described therein are obtained by free-radical polymerization of acrylates and comonomers which comprise a carbamate group and a (meth)acrylic group and can then be reacted in conventional manner with amino resins, for example, to form crosslinked film-forming resins.

The preparation of comonomers of this kind which bear a carbamate group and a (meth)acrylic group is known from WO 2004/050888 (corresponding to U.S. Pat. No. 7,164,037), for example.

Their structural flexibility makes melamine-formaldehyde resins interesting starting compounds for radiation-curable compounds.

Reaction products of etherified melamines with hydroxyl acrylates are known for application in radiation-curable coating compositions; see, for example, T. J. Giacobbe et al., Macromolecules, 4, 1971, 630 ff. or JP63286426.

The presence of acid-labile formals or N,O-acetals, however, makes such structures unstable in the acidic pH range, and this is manifested, for example, in lability under moisture exposure (see below).

U.S. Pat. No. 4,266,053 describes (meth)acrylates comprising melamine rings, prepared as reaction products of melamine-based polyols with (meth)acrylic acid, for use in UV-curing coatings on—among others—plastics parts. Although they feature better moisture resistance than the compounds described by T. J. Giacobbe et al. (see comparative example 1 in table 1 of U.S. Pat. No. 4,266,053), their preparation is necessarily complicated, on the basis of cyanuric chloride.

It was an object of the present invention to provide new, radiation-curable compounds based on melamine-formaldehyde resins that are stable to re-cleavage over a broad pH range, and are simple to prepare.

This object has been achieved by means of radiation-curable compounds obtainable by reacting at least one melamine-formaldehyde resin with at least one compound of the formula (I),

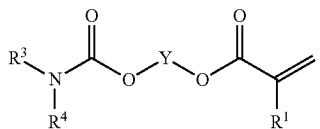

in which
$R^3$ and $R^4$ independently of one another are hydrogen, $C_1$-$C_{18}$ alkyl, $C_6$-$C_{12}$ aryl or $C_5$-$C_{12}$ cycloalkyl, Y is selected from 1,2-ethylene, 1,2-propylene, 1,1-dimethyl-1,2-ethylene, 1-hydroxymethyl-1,2-ethylene, 2-hydroxy-1,3-propylene, 1,3-propylene, 1,4-butylene, 1,6-hexylene, 2-methyl-1,3-propylene, 2-ethyl-1,3-propylene, 2,2-dimethyl-1,3-propylene, and 2,2-dimethyl-1,4-butylene, or

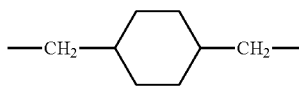

or 1,2-, 1,3- or 1,4-cyclohexylene,
$R^1$ is hydrogen or methyl, preferably hydrogen,
with the proviso that at least one of the radicals $R^3$ and $R^4$ is hydrogen.

The compounds of the formula (I) can be prepared preferably by esterifying alcohols (C) containing urethane groups

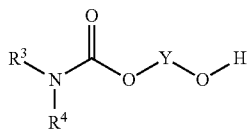
(C)

with (meth)acrylic acid or with a (meth)acrylic ester, preferably a (meth)acrylic acid alkyl ester, more preferably a (meth)acrylic acid alkyl ester whose alkyl radical contains 1 to 8 carbon atoms.

One possible preferred preparation of such alcohols (C) containing urethane groups is described in WO 2004/050888, page 3 line 26 to page 7 line 23 (corresponding to U.S. Pat. No. 7,164,037, column 2 line 56 to column 5 line 33), which is hereby incorporated by reference to become part of the present description.

One possibility for the preparation of the compounds of the formula (I) is described in WO 2004/050888, page 8 line 7 to page 11 line 38 (corresponding to U.S. Pat. No. 7,164,037, column 5 line 57 to column 8 line 34), which is hereby incorporated by reference to become part of the present description, or in the German patent application with the application number 102009003035.2 and the filing date of May 12, 2009 (corresponding to the international patent application with the application number PCT/EP2010/056079 and the application date of May 5, 2010, and also to the U.S. patent application Ser. No. 12/776,670 and the application date of May 10, 2010).

Following compounds of the formula (I) are preferred:
Y is preferably 1,2-ethylene, 1,2-propylene, 1,3-propylene, more preferably 1,2-ethylene and 1,2-propylene, and very preferably 1,2-propylene.

Examples of $R^3$ and/or $R^4$ are hydrogen, methyl, ethyl, isopropyl, n-propyl, n-butyl, isobutyl, sec-butyl, tert-butyl, n-hexyl, n-heptyl, n-octyl, n-decyl, n-dodecyl, n-tetradecyl, n-hexadecyl, n-octadecyl, n-eicosyl, 2-ethylhexyl, cyclopentyl, cyclohexyl, cyclooctyl, cyclododecyl, 2-hydroxyethyl, 2-hydroxypropyl, 1-hydroxypropyl, 5-hydroxy-3-oxa-pentyl, 8-hydroxy-3,6-dioxaoctyl or 11-hydroxy-3,6,9-trioxaundecyl.

$R^3$ and/or $R^4$ is preferably hydrogen, methyl, ethyl, isopropyl, n-butyl, tent-butyl, and cyclohexyl, more preferably hydrogen, methyl, ethyl, n-butyl, and tert-butyl, very preferably hydrogen, methyl or ethyl, more particularly hydrogen or methyl, and especially both radicals are hydrogen.

Preferably the alcohols (C) are selected from the group consisting of 2-hydroxyethyl carbamate, 2-hydroxy-1-propyl carbamate and 3-hydroxy-2-propyl carbamate. The latter are used preferably in the form of an isomer mixture.

A melamine-formaldehyde resin in the context of the present specification is the reaction product of melamine, formaldehyde, and, if desired, at least one alcohol, preferably of melamine, formaldehyde, and one or two alkanols, more preferably melamine, formaldehyde, and an alkanol. With very particular preference the alkanols are selected from the group consisting of methanol, ethanol, n-butanol, isobutanol, and secondary-butanol, preferably selected from the group consisting of methanol, n-butanol, and isobutanol; more preferably they are methanol and/or n-butanol, and very preferably methanol or n-butanol.

The melamine-formaldehyde resin is preferably a compound of the formula $$\text{Mel-N}_3 \text{FA}_{fA} R^5_{mA} H_{6-fA}$$

in which
Mel-$N_3$ is a melamine radical formed by imaginary abstraction of the six hydrogen atoms attached to the amino groups in melamine,
FA is a group —$CH_2$—O—,
$R^5$ is a $C_1$-$C_8$ alkyl group.
$R^5$ in accordance with the invention is one or more different $C_1$-$C_8$ alkyl groups, preferably a $C_1$-$C_4$ alkyl group, preferably a methyl, ethyl or butyl group, very preferably a methyl group or an n-butyl group, more particularly a methyl group.

$C_1$-$C_8$ alkyl groups are for example methyl, ethyl, n-propyl, isopropyl, n-butyl, isobutyl, 2-butyl, tert-butyl, 1-pentyl, 2-pentyl, isoamyl, n-hexyl, n-octyl or 2-ethylhexyl.

$C_1$-$C_4$ alkyl for the purposes of this specification is methyl, ethyl, n-propyl, isopropyl, n-butyl, isobutyl, 2-butyl or tert-butyl.

Butanol for the purposes of this specification refers collectively to n-butanol, isobutanol, sec-butanol, and mixtures thereof, preferably n-butanol or isobutanol, and more preferably n-butanol.

$f_A$ can adopt any desired values from 3.6 to a maximum of 6.0. Preferably $f_A$ is at least 4.1, more preferably at least 4.2, and very preferably at least 5.0.

Generally speaking, $f_A$ adopts values of preferably a maximum of 6.0, more preferably not more than 5.8, very preferably not more than 5.6, and more particularly not more than 5.4.

On the basis of a consideration of the fundamentals, mA cannot be greater than $f_A$.

For example, $m_A$ adopts values of at least 2.0, preferably at least 2.4, more preferably at least 2.9, and very preferably at least 3.4.

Generally speaking, $m_A$ is not greater than 5.0, preferably not greater than 4.9, more preferably not greater than 4.8, and very preferably not greater than 4.7.

The formula Mel-N$_3$ FA$_{fA}$ R$^5_{mA}$ H$_{6-fA}$ is considered a description in general form and is calculated from the resin analyses without taking account of any bridges formed by condensation. Starting from total nitrogen, determined by means of elemental analysis, the melamine content in the resin structure is calculated and is standardized as Mel-N$_3$=1. The incorporated formaldehyde is calculated as total formaldehyde (determined following acid digestion) minus the free formaldehyde (DIN 16746-A, sulfite method), on a molar basis based on melamine. This is the number $f_A$. The incorporated alcohol is determined from the difference between the total alcohol content, according to gas chromatography after acid digestion, and the free alcohol content according to gas chromatography, on a molar basis based on melamine.

In one preferred embodiment of the present invention, in the melamine-formaldehyde resin employed, of the methylol groups that are present in the molecule, introduced by formaldehyde, whose number is given by $f_A$, there are generally at least 50% that are etherified by groups R$^5$, and so $m_A \geq 0.5 \times f_A$, preferably at least 55%, more preferably at least 60%, and more preferably at least 65%.

Generally speaking, not more than 99% are etherified by groups R$^5$, and so $m_A \leq 0.99 \times f_A$, preferably not more than 95%, more preferably not more than 90%, and very preferably not more than 87%.

For the above-mentioned HMMM grades, however, it is entirely possible for all methylol groups to be etherifed, and so for these resins it is the case that $m_A = f_A$.

The solids content of the melamine-formaldehyde resin employed has no part to play in accordance with the invention. The solids content may be, for example, at least 50%, preferably at least 60%, more preferably at least 70%, and very preferably at least 75%, by weight.

In general the solids content will not exceed 98%, and with preference will not exceed 97%.

The solids content is determined in accordance with ISO 3251, by spreading out 2 g of the sample material and 2 ml of n-butanol in a well-ventilated drying cabinet for a duration of 2 hours with heating at 125° C. For the calculation, the sample is weighed before and after, and the ratio provides the solids content.

The melamine-formaldehyde resin employed may comprise at least one solvent, examples being water, $C_1$-$C_4$ alkyl alcohols, such as methanol, ethanol, isopropanol, n-propanol, n-butanol, isobutanol, sec-butanol or tert-butanol, for example, or aromatic hydrocarbons, such as toluene or else xylene isomer mixtures, for example.

The free formaldehyde content of the melamine-formaldehyde resin employed is generally not more than 1.5% by weight; for example, it may be not more than 1.0%, preferably not more than 0.6%, more preferably not more than 0.5%, and very preferably not more than 0.3%, by weight.

The free formaldehyde content is more particularly not more than 0.2% and especially not more than 0.15% by weight, and in individual cases is not more than 0.1% by weight.

The free formaldehyde content is determined in accordance with EN ISO 11402.

Information on the resin distribution according to polymer definition is provided by gel permeation chromatography (GPC) and by GPC/MS coupling. The resins may comprise dimers and trimers and also higher oligomers, up to a mass fraction of 90%.

The compounds of the invention are obtainable by a reaction of melamine-formaldehyde resins with (meth)acrylates bearing carbamate groups, which proceeds preferably at acidic pH:

The reaction takes place at a pH of not more than 6.0, preferably not more than 5.0, more preferably not more than 4.5, very preferably between 1 and 4, and more particularly between 1 and 3.

Suitable acidic catalysts are sulfuric acid, nitric acid, phosphoric acid, hydrochloric acid, para-toluenesulfonic acid, benzenesulfonic acid, dodecylbenzenesulfonic acid, methanesulfonic acid or mixtures thereof; acidic ion exchangers are also conceivable. Preference is given to sulfonic acids, particular preference to para-toluenesulfonic acid, benzenesulfonic acid, dodecylbenzenesulfonic acid, methanesulfonic acid or mixtures thereof.

The acidic catalyst will be added generally in amounts of 0.1% to 10%, preferably 0.5% to 7.5%, more preferably 1% to 6%, and very preferably 3% to 5%, by weight. It may be sensible to introduce the catalyst in two or more portions.

The molar stoichiometric ratio between the compound of the formula (I) and melamine-formaldehyde resin employed (based on melamine units in the melamine-formaldehyde resin) in the reaction is generally from 10:1 to 1:1, preferably from 8:1 to 1.5:1, more preferably from 6:1 to 2:1. If the intention is that some of the compound of the formula (I) should not react during the reaction, it may remain unreacted and without separation in the reaction mixture, and may function as a reactive diluent.

In accordance with the invention it is unimportant whether the compound of the formula (I) is introduced first and the melamine-formaldehyde resin added, or the melamine-formaldehyde resin is introduced first in a part of the compound of the formula (I), and the remainder of the compound of the formula (I) is added continuously or in portions, or the melamine-formaldehyde resin is introduced first and then the compound of the formula (I) is added.

The temperature in the reaction ranges generally from room temperature to 150° C., preferably from 50 to 130° C., more preferably from 60 to 120° C., and very preferably from 70 to 100° C.

The reaction time during the transetherification is from 10 minutes to 6 hours.

The number-average molar weight $M_n$ of the resultant, inventively modified melamine-formaldehyde resins is generally less than 2000 g/mol, preferably less than 1500 g/mol, and more preferably less than 1300 (determined by gel permeation chromatography with tetrahydrofuran and polystyrene as standard, DIN 55672, Part 1).

In one preferred embodiment the acid number of the resultant melamine-formaldehyde resins is less than 20, more preferably less than 15, and very preferably less than 10 mg KOH/g, determined in accordance with ISO 3682.

In one preferred embodiment the color number of the resultant melamine-formaldehyde resins is less than 200, more preferably less than 150, determined in accordance with DIN EN 1557.

The free formaldehyde content as per EN ISO 11402 in the resultant melamine-formaldehyde resins is generally not more than 0.5%, preferably not more than 0.3%, more preferably not more than 0.1%, and very preferably not more than 0.05% by weight.

The modified melamine-formaldehyde resin obtained in accordance with the invention may subsequently be mixed with commonplace solvents.

Examples of such solvents are aromatic and/or (cyclo)aliphatic hydrocarbons and mixtures thereof, halogenated hydrocarbons, esters, ethers, and alcohols.

Preference is given to aromatic hydrocarbons, (cyclo)aliphatic hydrocarbons, alkanoic acid alkyl esters, alkoxylated alkanoic acid alkyl esters, and mixtures thereof.

Particular preference is given to mono- or polyalkylated benzenes and naphthalenes, alkanoic acid alkyl esters and alkoxylated alkanoic acid alkyl esters, and mixtures thereof.

Preferred aromatic hydrocarbon mixtures are those comprising predominantly aromatic $C_7$ to $C_{14}$ hydrocarbons and being able to encompass a boiling range from 110 to 300° C.; particular preference is given to toluene, o-, m- or p-xylene, trimethylbenzene isomers, tetramethylbenzene isomers, ethylbenzene, cumene, tetrahydronaphthalene, and mixtures comprising them.

Examples thereof are the Solvesso® grades from ExxonMobil Chemical, especially Solvesso® 100 (CAS No. 64742-95-6, predominantly $C_9$ and $C_{10}$ aromatics, boiling range about 154-178° C.), 150 (boiling range about 182-207° C.), and 200 (CAS No. 64742-94-5), and also the Shellsol® grades from Shell. Hydrocarbon mixtures of paraffins, cycloparaffins, and aromatics are also available commercially under the Kristalloel names (for example, Kristalloel 30, boiling range about 158-198° C. or Kristalloel 60: CAS No. 64742-82-1), white spirit (for example likewise CAS No. 64742-82-1) or solvent naphtha (light: boiling range about 155-180° C., heavy: boiling range about 225-300° C.). The aromatics content of hydrocarbon mixtures of this type is generally more than 90%, preferably more than 95%, more preferably more than 98%, and very preferably more than 99%, by weight. It may be sensible to use hydrocarbon mixtures having a particularly reduced naphthalene content.

The density at 20° C. to DIN 51757 of the hydrocarbons can be less than 1 $g/cm^3$, preferably less than 0.95 and more preferably less than 0.9 $g/cm^3$.

The aliphatic hydrocarbons content is generally less than 5%, preferably less than 2.5%, and more preferably less than 1%, by weight.

Halogenated hydrocarbons are for example chlorobenzene and dichlorobenzene or its isomer mixtures.

Esters are for example n-butyl acetate, ethyl acetate, 1-methoxyprop-2-yl acetate, and 2-methoxyethyl acetate, and also the monoacetyl and diacetyl esters of ethylene glycol, diethylene glycol, triethylene glycol, propylene glycol, dipropylene glycol or tripropylene glycol, such as, for example, butylglycol acetate. Further examples are also carbonates, such as preferably 1,2-ethylene carbonate, 1,2-propylene carbonate or 1,3-propylene carbonate.

Ethers are for example tetrahydrofuran (THF), dioxane, and also the dimethyl, diethyl or di-n-butyl ethers of ethylene glycol, diethylene glycol, triethylene glycol, propylene glycol, dipropylene glycol or tripropylene glycol.

(Cyclo)aliphatic hydrocarbons are for example decalin, alkylated decalin, and isomer mixtures of linear or branched alkanes and/or cycloalkanes.

Of further preference are n-butyl acetate, ethyl acetate, 1-methoxyprop-2-yl acetate, 2-methoxyethyl acetate, and also mixtures thereof, especially with the aromatic hydrocarbon mixtures set out above.

Mixtures of this kind may be produced in a volume ratio of 10:1 to 1:10, preferably in a volume ratio of 5:1 to 1:5, and more preferably in a volume ratio of 1:1, not counting any solvents still present in the reaction mixture from the transetherification, and more particularly the alcohols $R^5OH$ and $R^6OH$.

Preferred examples are butyl acetate/xylene, 1:1 methoxypropyl acetate/xylene, 1:1 butyl acetate/solvent naphtha 100, 1:2 butyl acetate/Solvesso® 100, and 3:1 Kristalloel 30/Shellsol® A.

Alcohols are for example methanol, ethanol, n-propanol, isopropanol, n-butanol, sec-butanol, isobutanol, pentanol isomer mixtures, hexanol isomer mixtures, 2-ethylhexanol or octanol.

Also conceivable, though less preferred, is water, especially when used with other organic solvents as solubilizers in a mixture.

The amount of the resultant melamine-formaldehyde resins in the solvents after mixing can be in general up to 98% by weight, based on the sum of melamine-formaldehyde resin and solvent, preferably up to 95%, more preferably up to 90%, very preferably up to 86%, and more particularly up to 80%, by weight.

In one preferred embodiment of the present invention the modified melamine-formaldehyde resins obtainable in accordance with the invention are prepared in a reactive diluent and/or mixed with such diluents after their preparation.

Reactive diluents of this kind are at least one, for example one to three, preferably one to two, and more preferably just one compound which contains at least one, preferably at least two, free-radically polymerizable, preferably radiation-curable groups, for example two to six, preferably two to four, and more preferably two to three.

The reactive diluents preferably have a low viscosity of, preferably, less than 15 000 mPas (at 25° C. in accordance with DIN EN ISO 3219/A.3).

The reactive diluents have an average molecular weight of up to 1000, preferably up to 750 g/mol. The compounds in question are preferably polyether (meth)acrylate or a (meth)acrylate of a diol, triol or tetraol, or a urethane di(meth)acrylate based on a diisocyanate.

Particularly preferred reactive diluents have a boiling point of more than 200° C. under atmospheric pressure.

The reactive diluents may for example be reactive diluents of the kind described generally in P.K.T. Oldring (editor), Chemistry & Technology of UV & EB Formulations for Coatings, Inks & Paints, Vol. II, Chapter III: Reactive Diluents for UV & EB Curable Formulations, Wiley and SITA Technology, London 1997.

Examples of reactive diluents with a free-radically polymerizable group are methyl acrylate and methyl methacrylate.

Preferred reactive diluents are the diesters and polyesters of (meth)acrylic acid with diols or polyols. Particularly preferred are hexanediol diacrylate, hexanediol dimethacrylate, octanediol diacrylate, octanediol dimethacrylate, nonanediol diacrylate, nonanediol dimethacrylate, decanediol diacrylate, decanediol dimethacrylate, pentaerythrityl tetraacrylate, dipentaerythrityl tetraacrylate, dipentaerythrityl triacrylate, pentaerythrityl tetraacrylate, etc. Also preferred are the esters of alkoxylated polyols, with α,β-ethylenically unsaturated monocarboxylic and/or dicarboxylic acids, such as, for example, the polyacrylates or polymethacrylates of trimethylolpropane, glycerol or pentaerythritol with on average three fold to 20-fold, preferably three fold to 15-fold, more preferably three fold to nine fold alkoxylation, especially ethoxylation, and also of diethylene glycol, triethylene glycol, dipropylene glycol or tripropylene glycol. Suitability is also possessed by the esters of alicyclic diols, such as cyclohexanediol di(meth)acrylate and bis(hydroxymethyl)cyclohexane di(meth)acrylate.

With particular preference the reactive diluent is selected from the group consisting of ethylene glycol di(meth)acrylate, diethyleneglycol di(meth)acrylate, triethylene glycol di(meth)acrylate, butanediol di(meth)acrylate, hexanediol di(meth)acrylate, trimethylolpropane mono-, di- or tri(meth)acrylate, pentaerythrityl mono-, di-, tri- or tetra(meth)acrylate, and 2,2-bis-4-(2-hydroxy-3-methacryloyloxy)phenylpropane.

A further embodiment of the present invention uses, as reactive diluents, reaction products, free from NCO groups, of aliphatic or aromatic diisocyanates and (meth)acrylic esters which carry isocyanate-reactive groups, preferably OH groups. Use may be made, for example, of reaction products of aliphatic or aromatic diisocyanates and hydroxyethyl (meth)acrylate, hydroxypropyl (meth)acrylate or hydroxybutyl (meth)acrylate. Preferred diisocyanates are are 2,4'- and 4,4'-diphenylmethane diisocyanate (MDI), 2,4- or 2,6-tolylene diisocyanate (TDI), tetramethylene diisocyanate, hexamethylene diisocyanate, 2,4'- and 4,4'-methylenebis(cyclohexyl)diisocyanate, xylylene diisocyanate, tetramethylxylylene diisocyanate, dodecyl diisocyanate, lysine alkyl ester diisocyanate, where alkyl is $C_1$ to $C_{10}$, 2,2,4- or 2,4,4-trimethyl-1,6-hexamethylene diisocyanate, 1,4-diisocyanatocyclohexane, 1,3- or 1,4-bis(isocyanatomethyl)cyclohexane, triisocyanatotoluene, isophorone diisocyanate (IPDI), 2-butyl-2-ethylpentamethylene diisocyanate, 2-isocyanatopropylcyclohexyl isocyanate, 3(4)-isocyanatomethyl-1-methylcyclohexyl isocyanate, 1,4-diisocyanato-4-methylpentane, or and 2- or 4-methylcyclohexane 1,3-diisocyanate (H-TDI), or mixtures of the aforementioned isocyanates.

Particularly preferred are reaction products of aliphatic diisocyanates, such as tetramethylene diisocyanate, hexamethylene diisocyanate, 2,4'- and 4,4'-methylenebis(cyclohexyl)diisocyanate, xylylene diisocyanate, tetramethylxylylene diisocyanate, dodecyl diisocyanate, lysine alkyl ester diisocyanate, where alkyl is $C_1$ to $C_{10}$, 2,2,4- or 2,4,4-trimethyl-1,6-hexamethylene diisocyanate, 1,4-diisocyanatocyclohexane, 1,3- or 1,4-bis(isocyanatomethyl)cyclohexane, isophorone diisocyanate (IPDI), 2-butyl-2-ethylpentamethylene diisocyanate, 2-isocyanatopropylcyclohexyl isocyanate, 3(4)-isocyanatomethyl-1-methylcyclohexyl isocyanate, 1,4-diisocyanato-4-methylpentane, or and 2- or 4-methylcyclohexane 1,3-diisocyanate (H-TDI), and hydroxyethyl (meth)acrylate, hydroxypropyl (meth)acrylate or hydroxybutyl (meth)acrylate. Especially preferred are reaction products of hexamethylene diisocyanate, isophorone diisocyanate, 2,2,4- or 2,4,4-trimethyl-1,6-hexamethylene diisocyanate, and hydroxyethyl methacrylate, hydroxypropyl methacrylate or hydroxybutyl methacrylate, and also, especially, the reaction product of 2,2,4- and/or 2,4,4-trimethyl-1,6-hexamethylene diisocyanate and two equivalents of hydroxyethyl methacrylate, as known under the trivial name urethane dimethacrylate or UDMA.

The present invention further provides coating compositions which comprise
    at least one radiation-curable compound according to the present invention,
    if desired, at least one reactive diluent,
    if desired, at least one solvent,
    if desired, further, typical coatings additives, and
    at least one photoinitiator.

Examples of further, typical coatings additives which can be used include antioxidants, stabilizers, activators (accelerants), fillers, pigments, dyes, antistats, flame retardants, thickeners, thixotropic agents, surface-active agents, viscosity modifiers, plasticizers or chelating agents.

Suitable thickeners, in addition to free-radically (co)polymerized (co)polymers, include customary organic and inorganic thickeners such as hydroxylmethylcellulose or bentonite.

Examples of chelating agents which can be used include ethylene diamine acetic acid and salts thereof, and also β-diketones.

Suitable fillers comprise silicates, examples being silicates obtainable by hydrolysis of silicon tetrachloride, such as Aerosil® from Degussa, siliceous earth, talc, aluminum silicates, magnesium silicates, calcium carbonates, etc.

Suitable stabilizers comprise typical UV absorbers such as oxanilides, triazines, and benzotriazole (the latter available as Tinuvin® grades from Ciba-Spezialitätenchemie), and benzophenones. These can be used alone or together with suitable free-radical scavengers, examples being sterically hindered amines such as 2,2,6,6-tetramethylpiperidine, 2,6-di-tert-butylpiperidine or derivatives thereof, e.g., bis(2,2,6,6-tetramethyl-4-piperidyl)sebacate. Stabilizers are used typically in amounts of 0.1% to 5.0% by weight, based on the solid components present in the formulation.

Pigments may likewise be included. Pigments, according to CD Römpp Chemie Lexikon—Version 1.0, Stuttgart/New York: Georg Thieme Verlag 1995, with reference to DIN 55943, are particulate "organic or inorganic, chromatic or achromatic colorants that are virtually insoluble in the application medium".

Virtually insoluble here means a solubility at 25° C. below 1 g/1000 g of application medium, preferably below 0.5, more preferably below 0.25, very preferably below 0.1, and more particularly below 0.05 g/1000 g of application medium.

Where a pigment is used, it is necessary to ensure either that the curing is carried out with electron beams or that a photoinitiator is used which can be activated by the irradiated radiation in spite of the pigmentation; for example, by the photoinitiator having a significant absorption in a wavelength range in which the pigment is sufficiently transparent for the irradiated radiation. One preferred embodiment of the present invention uses no pigment and uses the coating composition in clearcoat materials.

Examples of pigments comprise any desired systems of absorption pigments and/or effect pigments, preferably absorption pigments. There are no restrictions whatsoever on the number or selection of the pigment components. They may be adapted as desired to the particular requirements, such as, for example, to the desired perceived color.

Effect pigments are all pigments which exhibit a platelet-shaped construction and impart specific decorative color effects to a surface coating. The effect pigments comprise, for example, all of the effect-imparting pigments which can be employed commonly in vehicle finishing and industrial coating. Examples of effect pigments of these kinds are pure metal pigments, such as aluminum, iron or copper pigments; interference pigments, such as titanium dioxide-coated mica, iron oxide-coated mica, mixed oxide-coated mica (e.g., with titanium dioxide and $Fe_2O_3$ or titanium dioxide and $Cr_2O_3$), metal oxide-coated aluminum, or liquid-crystal pigments.

The color-imparting absorption pigments are, for example, customary organic or inorganic absorption pigments which can be used in the coatings industry. Examples of organic absorption pigments are azo pigments, phthalocyanine pigments, quinacridone pigments, and pyrrolopyrrole pigments. Examples of inorganic absorption pigments are iron oxide pigments, titanium dioxide, and carbon black.

Where the coating compositions are cured not with electron beams but instead by means of UV radiation, there is preferably at least one photoinitiator present which is able to initiate the polymerization of ethylenically unsaturated double bonds.

Photoinitiators may be, for example, photoinitiators known to the skilled worker, examples being those specified in "Advances in Polymer Science", Volume 14, Springer Berlin 1974 or in K. K. Dietliker, Chemistry and Technology of UV and EB Formulation for Coatings, Inks and Paints, Volume 3; Photoinitiators for Free Radical and Cationic Polymerization, P. K. T. Oldring (editor), SITA Technology Ltd, London.

Suitability is possessed for example by monoacyl- or bisacylphosphine oxides, as described, for example, in EP-A 7 508, EP-A 57 474, DE-A 196 18 720, EP-A 495 751 or EP-A 615 980, examples being 2,4,6-trimethylbenzoyldiphenylphosphine oxide (Lucirin® TPO from BASF SE), ethyl 2,4,6-trimethylbenzoylphenylphosphinate (Lucirin® TPO L from BASF SE), bis(2,4,6-trimethylbenzoyl)phenylphosphine oxide (Irgacure® 819 from Ciba Spezialitätenchemie), benzophenones, hydroxyacetophenones, phenylglyoxylic acid and its derivatives, or mixtures of these photoinitiators. Examples include benzophenone, acetophenone, acetonaphthoquinone, methyl ethyl ketone, valerophenone, hexanophenone, α-phenylbutyrophenone, p-morpholinopropiophenone, dibenzosuberone, 4-morpholinobenzophenone, 4-morpholinodeoxybenzoin, p-diacetylbenzene, 4-aminobenzophenone, 4'-methoxyacetophenone, β-methylanthraquinone, tert-butylanthraquinone, anthraquinonecarboxylic esters, benzaldehyde, α-tetralone, 9-acetylphenanthrene, 2-acetylphenanthrene, 10-thioxanthenone, 3-acetylphenanthrene, 3-acetylindole, 9-fluorenone, 1-indanone, 1,3,4-triacetylbenzene, thioxanthen-9-one, xanthen-9-one, 2,4-dimethylthioxanthone, 2,4-diethylthioxanthone, 2,4-diisopropylthioxanthone, 2,4-dichlorothioxanthone, benzoin, benzoin isobutyl ether, chloroxanthenone, benzoin tetrahydropyranyl ether, benzoin methyl ether, benzoin ethyl ether, benzoin butyl ether, benzoin isopropyl ether, 7H-benzoin methyl ether, benz[de]anthracen-7-one, 1-naphthaldehyde, 4,4'-bis(dimethylamino) benzophenone, 4-phenylbenzophenone, 4-chlorobenzophenone, Michler's ketone, 1-acetonaphthone, 2-acetonaphthone, 1-benzoyl-cyclohexan-1-ol, 2-hydroxy-2,2-dimethylacetophenone, 2,2-dimethoxy-2-phenylacetophenone, 2,2-diethoxy-2-phenylacetophenone, 1,1-dichloracetophenone, 1-hydroxy-acetophenone, acetophenone dimethyl ketal, o-methoxybenzophenone, triphenylphosphine, tri-o-tolylphosphine, benz[a]anthracene-7,12-dione, 2,2-diethoxyacetophenone, benzil ketals, such as benzil dimethyl ketal, 2-methyl-1-[4-(methylthio)phenyl]-2-morpholinopropan-1-one, anthraquinones such as 2-methylanthraquinone, 2-ethylanthraquinone, 2-tert-butylanthraquinone, 1-chloroanthraquinone, 2-amylanthraquinone, and 2,3-butanedione.

Also suitable are nonyellowing or low-yellowing photoinitiators of the phenylglyoxalic ester type, as described in DE-A 198 26 712, DE-A 199 13 353 or WO 98/33761.

Typical mixtures comprise, for example, 2-hydroxy-2-methyl-1-phenylpropan-2-one and 1-hydroxycyclohexyl phenyl ketone, bis(2,6-dimethoxybenzoyl)-2,4,4-trimethyl-pentylphosphine oxide and 2-hydroxy-2-methyl-1-phenylpropan-1-one, benzophenone and 1-hydroxycyclohexyl phenyl ketone, bis(2,6-dimethoxybenzoyl)-2,4,4-trimethylpentylphosphine oxide and 1-hydroxycyclohexyl phenyl ketone, 2,4,6-trimethylbenzoyldiphenylphosphine oxide and 2-hydroxy-2-methyl-1-phenylpropan-1-one, 2,4,6-trimethylbenzophenone and 4-methylbenzophenone or 2,4,6-trimethylbenzophenone and 4-methylbenzophenone and 2,4,6-trimethylbenzoyldiphenylphosphine oxide.

Preferred among these photoinitiators are 2,4,6-trimethylbenzoyldiphenylphosphine oxide, ethyl 2,4,6-trimethylbenzoylphenylphosphinate, bis(2,4,6-trimethylbenzoyl)-phenylphosphine oxide, benzophenone, 1-benzoylcyclohexan-1-ol, 2-hydroxy-2,2-dimethylacetophenone, and 2,2-dimethoxy-2-phenylacetophenone.

The coating compositions comprise the photoinitiators preferably in an amount of 0.05% to 10% by weight, more preferably 0.1% to 8% by weight, and more particularly 0.2% to 5% by weight, based on the total amount of the curable components.

The coating materials can be employed in particular in primers, surfacers, pigmented topcoat materials and clearcoat materials in the field of automotive refinish, large-vehicle finishing, and aircraft. Coating materials of this kind are particularly suitable for applications requiring particularly high levels of application reliability, external weathering resistance, hardness, and flexibility, such as in automotive refinish and large-vehicle finishing.

Coating compositions, comprising the by the inventively obtainable mixtures are especially employed as or in automotive clearcoat and topcoat material(s). Further preferred fields of use are can coating and coil coating.

Coil coating is the continuous coating of metal strips with coating materials, usually liquid coating materials. Rolled metal strips, after production, are wound up into rolls (referred to as "coils") for the purposes of storage and transport. These metal strips represent the starting material for the majority of sheetlike metallic workpieces, examples being automobile parts, bodywork parts, instrument paneling, exterior architectural paneling, ceiling paneling or window profiles, for example. For this purpose the appropriate metal sheets are shaped by means of appropriate techniques such as punching, drilling, folding, profiling and/or deep drawing. Larger components, such as automobile bodywork parts, for example, are assembled optionally by welding together a number of individual parts.

For the coating operation, metal strips with a thickness of 0.2 to 2 mm and a width of up to 2 m are transported at a speed of up to 200 m/min through a coil coating line, and are coated in the process. For this purpose it is possible to use, for example, cold-rolled strips of soft steels or construction-grade steels, electrolytically galvanized thin sheet, hot-dip-galvanized steel strip, or strips of aluminum or aluminum alloys. Typical lines comprise a feed station, a coil store, a cleaning and pretreatment zone, a first coating station along with baking oven and downstream cooling zone, a second coating station with oven, laminating station, and cooling, and also a coil store and winder.

Characteristic of coil coatings are thin films of the coating compositions, with a dry film thickness of usually well below 80 µm, often below 60 µm, below 50 µm, and even below 40

μm. Furthermore, the metal sheets are processed with a high throughput, which necessitates short residence times, i.e., necessitates drying at an elevated temperature following application of the coating, in order that the coating composition soon acquires load-bearing qualities.

Coating of the substrates with the coating compositions takes place in accordance with typical processes known to the skilled worker, a coating composition or a paint formulation comprising it being applied in the desired thickness to the target substrate and, optionally, dried. This operation may if desired be repeated one or more times. Application to the substrate may take place in a known way, as for example by spraying, troweling, knifecoating, brushing, rolling, roller coating, pouring, laminating, injection backmolding or coextruding.

Further disclosed is a method of coating substrates which involves applying to the substrate a coating composition or a paint formulation comprising it, admixed optionally with further, typical coatings additives and thermally, chemically or radiation-curable resins, drying the applied coating optionally, curing it with electron beams or UV exposure under an oxygen-containing atmosphere or, preferably, under inert gas, and subjecting it to thermal treatment, optionally, at temperatures up to the level of the drying temperature, and thereafter at temperatures up to 160° C., preferably between 60 and 160° C., more preferably between 100 and 160° C.

Radiation curing takes place with high-energy light, UV light for example, or electron beams. Radiation curing may take place at relatively high temperatures. Preference is given in that case to a temperature above the $T_g$ of the radiation-curable binder.

Radiation curing here means the free-radical polymerization of polymerizable compounds as a result of electromagnetic and/or particulate radiation, preferably UV light in the wavelength range of $\lambda=200$ to 700 nm and/or electron radiation in the range from 150 to 300 keV, and more preferably with a radiation dose of at least 80, preferably 80 to 3000 mJ/cm$^2$.

Besides radiation curing there may also be further curing mechanisms involved, examples being thermal curing, moisture curing, chemical curing and/or oxidative curing, preferably thermal and radiation curing, and more preferably radiation curing alone.

The coating materials may be applied one or more times by any of a very wide variety of spraying methods, such as compressed-air, airless or electrostatic spraying methods, using one- or two-component spraying units, or else by injecting, troweling, knifecoating, brushing, rolling, roller coating, pouring, laminating, injection backmolding or coextruding.

The coating thickness is generally in a range from about 3 to 1000 g/m$^2$ and preferably 10 to 200 g/m$^2$.

Drying and curing of the coatings take place generally under standard temperature conditions, i.e., without the coating being heated. Alternatively the mixtures of the invention can be used to produce coatings which, following application, are dried and cured at an elevated temperature, e.g., at 40-250° C., preferably 40-150° C., and more particularly at 40 to 100° C. This is limited by the thermal stability of the substrate.

Additionally disclosed is a method of coating substrates which involves applying the coating composition of the invention or paint formulations comprising it, optionally admixed with thermally curable resins, to the substrate, drying it, and then curing it with electron beams or UV exposure under an oxygen-containing atmosphere or, preferably, under inert gas, optionally at temperatures up to the level of the drying temperature.

The method of coating substrates can also be practiced by irradiating the applied coating composition of the invention, or paint formulations, first with electron beams or UV exposure, under oxygen or, preferably, under inert gas, in order to obtain preliminary curing, then carrying out thermal treatment at temperatures up to 160° C., preferably between 60 and 160° C., and subsequently completely curing with electron beams or UV exposure under oxygen or, preferably, under inert gas.

Optionally, if a plurality of layers of the coating material are applied one on top of another, drying and/or radiation curing may take place after each coating operation.

Examples of suitable radiation sources for the radiation cure are low-pressure, medium-pressure, and high-pressure mercury lamps, and also fluorescent tubes, pulsed lamps, metal halide lamps, electronic flash devices, which allow radiation curing without a photoinitiator, or excimer lamps. The radiation cure is accomplished by exposure to high-energy radiation, i.e., UV radiation or daylight, preferably light emitted in the wavelength range of $\lambda=200$ to 700 nm, more preferably $\lambda=200$ to 500 nm, and very preferably $\lambda=250$ to 400 nm, or by irradiation with high-energy electrons (electron radiation; 150 to 300 keV). Examples of radiation sources used include high-pressure mercury vapor lamps, lasers, pulsed lamps (flash light), halogen lamps or excimer lamps. The radiation dose typically sufficient for crosslinking in the case of UV curing is situated in the range from 80 to 3000 mJ/cm$^2$.

It will be appreciated that it is also possible to use two or more radiation sources for the cure, two to four for example. These sources may also each emit in different wavelength ranges.

Drying and/or thermal treatment may also take place, in addition to or instead of the thermal treatment, by means of NIR radiation, which here refers to electromagnetic radiation in the wavelength range from 760 nm to 2.5 μm, preferably from 900 to 1500 nm.

Irradiation can if desired also be carried out in the absence of oxygen, such as under an inert gas atmosphere. Suitable inert gases are preferably nitrogen, noble gases, carbon dioxide, or combustion gases. Furthermore, irradiation may take place with the coating composition being covered with transparent media. Examples of transparent media are polymeric films, glass or liquids, water for example. Particular preference is given to irradiation in the manner described in DE-A1 199 57 900.

Suitable substrates for the coating compositions of the invention are, for example, thermoplastic polymers, more particularly polymethyl methacrylates, polybutyl methacrylates, polyethylene terephthalates, polybutylene terephthalates, polyvinylidene fluorides, polyvinyl chlorides, polyesters, polyolefins, acrylonitrile-ethylene-propylene-diene-styrene copolymers (A-EPDM), polyetherimides, polyetherketones, polyphenylene sulfides, polyphenylene ethers or mixtures thereof.

Mention may additionally be made of polyethylene, polypropylene, polystyrene, polybutadiene, polyesters, polyamides, polyethers, polycarbonate, polyvinyl acetal, polyacrylonitrile, polyacetal, polyvinyl alcohol, polyvinyl acetate, phenolic resins, urea resins, melamine resins, alkyd resins, epoxy resins or polyurethanes, their block copolymers or graft copolymers, and blends thereof.

Mention may be made with preference of ABS, AES, AMMA, ASA, EP, EPS, EVA, EVAL, HDPE, LDPE, MABS, MBS, MF, PA, PA6, PA66, PAN, PB, PBT, PBTP, PC, PE, PEC, PEEK, PEI, PEK, PEP, PES, PET, PETP, PF, PI, FIB, PMMA, POM, PP, PPS, PS, PSU, PUR, PVAC, PVAL, PVC, PVDC, PVP, SAN, SB, SMS, UF, UP plastics (abbreviations according to DIN 7728), and aliphatic polyketones.

Particularly preferred substrates are polyolefins, such as, for example, PP (polypropylene), which may be alternatively isotactic, syndiotactic or atactic and alternatively unoriented or oriented by monoaxial or biaxial stretching, SAN (styrene-acrylonitrile copolymers), PC (polycarbonates), PVC (polyvinyl chlorides), PMMA (polymethyl methacrylates), PBT (poly(butylene terephthalate)s), PA (polyamides), ASA (acrylonitrile-styrene-acrylic ester copolymers) and ABS (acrylonitrile-butadiene-styrene copolymers), and also their physical mixtures (blends). Particular preference is given to PP, SAN, ABS, ASA, and also blends of ABS or ASA with PA or PBT or PC. Very particular preference is given to polyolefins, PMMA, and PVC.

Especially preferred is ASA, more particularly in accordance with DE 196 51 350, and the ASA/PC blend. Preference is likewise given to polymethyl methacrylate (PMMA) or impact-modified PMMA.

A further-preferred substrate for coating with the coating compositions of the invention are metals, which if desired may have been pretreated with a primer.

The nature of the metal is in principle arbitrary. More particularly, however, the metal comprises those metals or alloys which are commonly used as metallic materials of construction, and which require protection from corrosion.

The surfaces in question are more particularly those of iron, steel, Zn, Zn alloys, Al or Al alloys. These may be the surfaces of bodies consisting wholly of said metals/alloys. However, it is also possible for the bodies to be only coated with these metals and for the bodies themselves to be composed of different kinds of materials, as for example of other metals, alloys, polymers or composites. The surfaces in question may be surfaces of castings of galvanized iron or steel. In one preferred embodiment of the present invention the surfaces are steel surfaces.

Zn alloys or Al alloys are known to the skilled worker. The skilled worker selects the nature and amount of alloying constituents in accordance with the desired application. Typical constituents of zinc alloys comprise, in particular, Al, Pb, Si, Mg, Sn, Cu or Cd. Typical constituents of aluminum alloys comprise, in particular, Mg, Mn, Si, Zn, Cr, Zr, Cu or Ti. The alloys may also be Al/Zn alloys, in which Al and Zn are present in approximately equal amounts. Steel coated with alloys of this kind is available commercially. The steel may comprise the customary alloying components known to the skilled worker.

Also conceivable is the use of the coating compositions of the invention for the treatment of tin-plated iron/steel (tinplate).

The coating compositions and paint formulations of the invention are additionally suitable for coating substrates such as wood, paper, textile, leather, nonwoven, plastics surfaces, glass, ceramic, mineral construction materials, such as cement moldings and fiber-cement slabs, or coated or uncoated metals, preferably plastics or metals, more particularly in the form of films or foils, with particular preference metals.

The examples which follow are intended to illustrate the properties of the invention, but without restricting it.

EXAMPLES

Unless indicated otherwise, "parts" in this specification are to be understood as "parts by weight".

Luwipal® 066LF from BASF SE is a highly to fully methyl-etherified melamine-formaldehyde resin having a nonvolatiles content (as per ISO 3251) of 93-96% by weight, with a low free formaldehyde content of not more than 0.3% by weight. The viscosity (ISO 3219 B) is 2.0-6.0 Pas at 23° C. and a shear rate D of 41.3 $s^{-1}$.

HPC acrylate is the formal reaction product of 2-hydroxypropyl carbamate (isomer mixture of 2-hydroxy-1-propyl carbamate and 3-hydroxy-2-propyl carbamate) with acrylic acid. The purity of the HPC acrylate was at least 90% by weight, the amount of unacrylated 2-hydroxypropyl carbamate being below 5% by weight, and the remainder being unreacted acrylates.

Erichsen cupping and scratch resistance.

The pendulum damping was determined in accordance with DIN 53157. The pendulum damping is a measure of the hardness of the coating. High values in this test denote high hardness.

The Erichsen cupping was determined in accordance with DIN 53156. The Erichsen cupping is a measure of the flexibility and elasticity. It is reported in millimeters (mm). High values denote high flexibility.

The residual gloss was determined using the Scotch-Brite test after storage for 7 days in a controlled-climate chamber. In the Scotch-Brite test, a fiber web modified with silicon carbide and measuring 3×3 cm (Scotch Brite SUFN, from 3M) is affixed as the test element to a cylinder. The cylinder presses the fiber web against the coating with a defined applied weight, and is moved over the coating pneumatically. The path length of the deflection is 7 cm. After 10 or 50 double rubs (DR), the gloss is measured in the middle region of the exposure (eight-fold determination) in a method based on DIN 67530 with an incidence angle of 20°. The residual gloss value in percent is given by the ratio of gloss after exposure to initial gloss. High residual gloss values, i.e., low values for the loss of gloss, denote high scratch resistance.

Example 1

Preparation of Melamine Carbamate Hydroxypropyl Acrylate in Bulk, Atmospheric Pressure The thoroughly mixed initial charge of 65.1 g of Luwipal 66, 173.17 g of HPC acrylate and 0.1732 g of methylhydroquinone is admixed at room temperature with 1.19 g of methanesulfonic acid. This system is heated to an external temperature of 90° C., while air is bubbled through it. At an internal temperature of 85° C., methanol distillation is commenced. After the end of reaction, a product of high viscosity with a double bond density of 4.11 mol/kg is obtained.

Example 2

In Bulk, Reduced Pressure

The thoroughly mixed initial charge of 65.1 g of Luwipal 66, 173.17 g of HPC acrylate and 0.1732 g of methylhydroquinone is admixed at room temperature with 1.19 g of methanesulfonic acid and 0.012 g of phenothiazine. Heating takes place at a pressure of about 300 mbar up to an external temperature of 90° C. At an internal temperature of 65° C., methanol distillation commences. After the end of reaction, a highly viscous product having a double bond density of 4.08 mol/kg is obtained.

Example 3

Dilution with HDDA

The thoroughly mixed initial charge of 52.1 g of Luwipal 66, 138.5 g of HPC acrylate and 0.01 g of phenothiazine is admixed at room temperature with 1.9 g of methanesulfonic acid. Under a pressure of about 300 mbar, heating takes place to an external temperature of 90° C. At an internal temperature of 69° C., methanol distillation commences. After the end of reaction, the batch is diluted to a solids content of 80% by addition of 47.7 g of hexanediol diacrylate.

Example 4

Dilution with BuAc

The thoroughly mixed initial charge of 52.1 g of Luwipal 66, 138.5 g of HPC acrylate and 0.01 g of phenothiazine is admixed at room temperature with 1.9 g of methanesulfonic acid. Under a pressure of about 300 mbar, heating takes place to an external temperature of 90° C. At an internal temperature of 69° C., methanol distillation commences. After the end of reaction, the batch is diluted to a solids content of 80% by addition of 47.7 g of butyl acetate.

Use in UV-Curable Coatings

A formulation of 75% by weight of melamine carbamate hydroxypropyl acrylate from example 1, 25% by weight of butyl acetate and 4% of Irgacure® 184 (Ciba Spezialitätenchemie, 1-hydroxycyclohexyl phenyl ketone) was prepared and a)
using a four-path frame-type wet film applicator with a gap depth of 300 μm, was applied to a glass substrate. After the solvent had been flashed (15 minutes at room temperature, 20 minutes at 80° C.), the film was exposed with 1900 mJ/cm$^2$ (high-pressure Hg lamp) at room temperature in a nitrogen atmosphere. Cured film:

Pendulum damping: 189 sec
Residual gloss after 10DR with 250 g applied weight: 90.9%
Residual gloss after 50DR with 250 g applied weight: 82.6% b)
using a four-path frame-type wet film applicator with a gap depth of 400 μm, was applied to a glass substrate. After the solvent had been flashed (15 minutes at room temperature, 20 minutes at 80° C.), the film was exposed with 1900 mJ/cm$^2$ (high-pressure Hg lamp) at room temperature in an air atmosphere. Cured film:

Pendulum damping: 138 sec
Residual gloss after 10DR with 250 g applied weight: 62.3%
Residual gloss after 50DR with 250 g applied weight: 60.8% c)
using a four-path frame-type wet film applicator with a gap depth of 150 μm, was applied to a Bonder panel. After the solvent had been flashed (15 minutes at room temperature, 20 minutes at 80° C.), the film was exposed with 1900 mJ/cm$^2$ (high-pressure Hg lamp) at room temperature in a nitrogen atmosphere. Cured film:

Erichsen cupping: 1.1 mm d)
using a four-path frame-type wet film applicator with a gap depth of 200 μm, was applied to a Bonder panel. After the solvent had been flashed (15 minutes at room temperature, 20 minutes at 80° C.), the film was exposed with 1900 mJ/cm$^2$ (high-pressure Hg lamp) at room temperature in an air atmosphere. Cured film:

Erichsen cupping: 0.9 mm

A formulation of 80% by weight of melamine carbamate hydroxypropyl acrylate (prepared according to example 2), 20% by weight of butyl acetate and 4% of Irgacure® 184 was prepared and a)
using a four-path frame-type wet film applicator with a gap depth of 300 μm, was applied to a glass substrate. After the solvent had been flashed (15 minutes at room temperature, 20 minutes at 80° C.), the film was exposed with 1900 mJ/cm$^2$ (high-pressure Hg lamp) at room temperature in a nitrogen atmosphere. Cured film:

Pendulum damping: 178 sec
Residual gloss after 10DR with 250 g applied weight: 83.2%
Residual gloss after 50DR with 250 g applied weight: 70.0% b)
using a four-path frame-type wet film applicator with a gap depth of 400 μm, was applied to a glass substrate. After the solvent had been flashed (15 minutes at room temperature, 20 minutes at 80° C.), the film was exposed with 1900 mJ/cm$^2$ (high-pressure Hg lamp) at room temperature in an air atmosphere. Cured film:

Pendulum damping: 135 sec
Residual gloss after 10DR with 250 g applied weight: 54.3%
Residual gloss after 50DR with 250 g applied weight: 74.0% c)
using a four-path frame-type wet film applicator with a gap depth of 150 μm, was applied to a Bonder panel. After the solvent had been flashed (15 minutes at room temperature, 20 minutes at 80° C.), the film was exposed with 1900 mJ/cm$^2$ (high-pressure Hg lamp) at room temperature in a nitrogen atmosphere. Cured film:

Erichsen cupping: 1.4 mm d)
using a four-path frame-type wet film applicator with a gap depth of 200 μm, was applied to a Bonder panel. After the solvent had been flashed (15 minutes at room temperature, 20 minutes at 80° C.), the film was exposed with 1900 mJ/cm$^2$ (high-pressure Hg lamp) at room temperature in an air atmosphere. Cured film:

Erichsen cupping: 0.9 mm

A formulation of 70% by weight of melamine carbamate hydroxypropyl acrylate (prepared according to example 1), 30% by weight of hexanediol diacrylate and 4% of Irgacure® 184 was prepared and a)
using a four-path frame-type wet film applicator with a gap depth of 300 μm, was applied to a glass substrate. After the solvent had been flashed (15 minutes at room temperature, 20 minutes at 80° C.), the film was exposed with 1900 mJ/cm$^2$ (high-pressure Hg lamp) at room temperature in a nitrogen atmosphere. Cured film:

Pendulum damping: 174 sec
Residual gloss after 10DR with 250 g applied weight: 93.8%
Residual gloss after 50DR with 250 g applied weight: 89.6% b)
using a four-path frame-type wet film applicator with a gap depth of 400 μm, was applied to a glass substrate. After the solvent had been flashed (15 minutes at room temperature, 20 minutes at 80° C.), the film was exposed with 1900 mJ/cm$^2$ (high-pressure Hg lamp) at room temperature in an air atmosphere. Cured film:

Pendulum damping: 191 sec
Residual gloss after 10DR with 250 g applied weight: 68.3%
Residual gloss after 50DR with 250 g applied weight: 32.8% c)

using a four-path frame-type wet film applicator with a gap depth of 150 μm, was applied to a Bonder panel. After the solvent had been flashed (15 minutes at room temperature, 20 minutes at 80° C.), the film was exposed with 1900 mJ/cm² (high-pressure Hg lamp) at room temperature in a nitrogen atmosphere. Cured film:

Erichsen cupping: 0.8 mm d)

using a four-path frame-type wet film applicator with a gap depth of 200 μm, was applied to a Bonder panel. After the solvent had been flashed (15 minutes at room temperature, 20 minutes at 80° C.), the film was exposed with 1900 mJ/cm² (high-pressure Hg lamp) at room temperature in an air atmosphere. Cured film:

Erichsen cupping: 0.9 mm

A formulation of 50% by weight of melamine carbamate hydroxypropyl acrylate (prepared according to example 1), 50% by weight of hexanediol diacrylate and 4% of Irgacure® 184 was prepared and a)

using a four-path frame-type wet film applicator with a gap depth of 300 μm, was applied to a glass substrate. After the solvent had been flashed (15 minutes at room temperature, 20 minutes at 80° C.), the film was exposed with 1900 mJ/cm² (high-pressure Hg lamp) at room temperature in a nitrogen atmosphere. Cured film:

Pendulum damping: 166 sec

Residual gloss after 10DR with 250 g applied weight: 95.1%

Residual gloss after 50DR with 250 g applied weight: 86.4% b)

using a four-path frame-type wet film applicator with a gap depth of 400 μm, was applied to a glass substrate. After the solvent had been flashed (15 minutes at room temperature, 20 minutes at 80° C.), the film was exposed with 1900 mJ/cm² (high-pressure Hg lamp) at room temperature in an air atmosphere. Cured film:

Pendulum damping: 192 sec

Residual gloss after 10DR with 250 g applied weight: 60.9%

Residual gloss after 50DR with 250 g applied weight: 17.1% c)

using a four-path frame-type wet film applicator with a gap depth of 150 μm, was applied to a Bonder panel. After the solvent had been flashed (15 minutes at room temperature, 20 minutes at 80° C.), the film was exposed with 1900 mJ/cm² (high-pressure Hg lamp) at room temperature in a nitrogen atmosphere. Cured film:

Erichsen cupping: 0.8 mm d)

using a four-path frame-type wet film applicator with a gap depth of 200 μm, was applied to a Bonder panel. After the solvent had been flashed (15 minutes at room temperature, 20 minutes at 80° C.), the film was exposed with 1900 mJ/cm² (high-pressure Hg lamp) at room temperature in an air atmosphere. Cured film:

Erichsen cupping: 1.0 mm

A formulation of 70% by weight of melamine carbamate hydroxypropyl acrylate (prepared according to example 2), 30% by weight of hexanediol diacrylate and 4% of Irgacure® 184 was prepared and a)

using a four-path frame-type wet film applicator with a gap depth of 300 μm, was applied to a glass substrate. After the solvent had been flashed (15 minutes at room temperature, 20 minutes at 80° C.), the film was exposed with 1900 mJ/cm² (high-pressure Hg lamp) at room temperature in a nitrogen atmosphere. Cured film:

Pendulum damping: 178 sec

Residual gloss after 10DR with 250 g applied weight: 93.7%

Residual gloss after 50DR with 250 g applied weight: 85.7% b)

using a four-path frame-type wet film applicator with a gap depth of 400 μm, was applied to a glass substrate. After the solvent had been flashed (15 minutes at room temperature, 20 minutes at 80° C.), the film was exposed with 1900 mJ/cm² (high-pressure Hg lamp) at room temperature in an air atmosphere. Cured film:

Pendulum damping: 192 sec

Residual gloss after 10DR with 250 g applied weight: 68.7%

Residual gloss after 50DR with 250 g applied weight: 26.3% c)

using a four-path frame-type wet film applicator with a gap depth of 150 μm, was applied to a Bonder panel. After the solvent had been flashed (15 minutes at room temperature, 20 minutes at 80° C.), the film was exposed with 1900 mJ/cm² (high-pressure Hg lamp) at room temperature in a nitrogen atmosphere. Cured film:

Erichsen cupping: 2.0 mm d)

using a four-path frame-type wet film applicator with a gap depth of 200 μm, was applied to a Bonder panel. After the solvent had been flashed (15 minutes at room temperature, 20 minutes at 80° C.), the film was exposed with 1900 mJ/cm² (high-pressure Hg lamp) at room temperature in an air atmosphere. Cured film:

Erichsen cupping: 0.8 mm

A formulation of 50% by weight of melamine carbamate hydroxypropyl acrylate (prepared according to example 2), 50% by weight of hexanediol diacrylate and 4% of Irgacure® 184 was prepared and a)

using a four-path frame-type wet film applicator with a gap depth of 300 μm, was applied to a glass substrate. After the solvent had been flashed (15 minutes at room temperature, 20 minutes at 80° C.), the film was exposed with 1900 mJ/cm² (high-pressure Hg lamp) at room temperature in a nitrogen atmosphere. Cured film:

Pendulum damping: 168 sec

Residual gloss after 10DR with 250 g applied weight: 96.0%

Residual gloss after 50DR with 250 g applied weight: 92.5% b)

using a four-path frame-type wet film applicator with a gap depth of 400 μm, was applied to a glass substrate. After the solvent had been flashed (15 minutes at room temperature, 20 minutes at 80° C.), the film was exposed with 1900 mJ/cm² (high-pressure Hg lamp) at room temperature in an air atmosphere. Cured film:

Pendulum damping: 192 sec

Residual gloss after 10DR with 250 g applied weight: 55.3%

Residual gloss after 50DR with 250 g applied weight: 12.5% c)

using a four-path frame-type wet film applicator with a gap depth of 150 μm, was applied to a Bonder panel. After the solvent had been flashed (15 minutes at room temperature, 20 minutes at 80° C.), the film was exposed with 1900 mJ/cm$^2$ (high-pressure Hg lamp) at room temperature in a nitrogen atmosphere. Cured film:

Erichsen cupping: 0.9 mm d)

using a four-path frame-type wet film applicator with a gap depth of 200 μm, was applied to a Bonder panel. After the solvent had been flashed (15 minutes at room temperature, 20 minutes at 80° C.), the film was exposed with 1900 mJ/cm$^2$ (high-pressure Hg lamp) at room temperature in an air atmosphere. Cured film:

Erichsen cupping: 0.9 mm

A formulation of 96% by weight of melamine carbamate hydroxypropyl acrylate (prepared according to example 3) and 4% of Irgacure® 184 was prepared and a)

using a four-path frame-type wet film applicator with a gap depth of 200 μm, was applied to a glass substrate. After the solvent had been flashed (15 minutes at room temperature, 20 minutes at 80° C.), the film was exposed with 1900 mJ/cm$^2$ (high-pressure Hg lamp) at room temperature in a nitrogen atmosphere. Cured film:

Pendulum damping: 183 sec

Residual gloss after 10DR with 250 g applied weight: 78.3%

Residual gloss after 50DR with 250 g applied weight: 75.7% b)

using a four-path frame-type wet film applicator with a gap depth of 200 μm, was applied to a glass substrate. After the solvent had been flashed (15 minutes at room temperature, 20 minutes at 80° C.), the film was exposed with 1900 mJ/cm$^2$ (high-pressure Hg lamp) at room temperature in an air atmosphere. Cured film:

Pendulum damping: 216 sec

Residual gloss after 10DR with 250 g applied weight: 65.1%

Residual gloss after 50DR with 250 g applied weight: 22.5% c)

using a four-path frame-type wet film applicator with a gap depth of 100 μm, was applied to a Bonder panel. After the solvent had been flashed (15 minutes at room temperature, 20 minutes at 80° C.), the film was exposed with 1900 mJ/cm$^2$ (high-pressure Hg lamp) at room temperature in a nitrogen atmosphere. Cured film:

Erichsen cupping: 1.5 mm d)

using a four-path frame-type wet film applicator with a gap depth of 100 μm, was applied to a Bonder panel. After the solvent had been flashed (15 minutes at room temperature, 20 minutes at 80° C.), the film was exposed with 1900 mJ/cm$^2$ (high-pressure Hg lamp) at room temperature in an air atmosphere. Cured film:

Erichsen cupping: 2.3 mm

A formulation of 96% by weight of melamine carbamate hydroxypropyl acrylate (prepared according to example 4) and 4% of Irgacure® 184 was prepared and a)

using a four-path frame-type wet film applicator with a gap depth of 200 μm, was applied to a glass substrate. After the solvent had been flashed (15 minutes at room temperature, 20 minutes at 80° C.), the film was exposed with 1900 mJ/cm$^2$ (high-pressure Hg lamp) at room temperature in a nitrogen atmosphere. Cured film:

Pendulum damping: 185 sec

Residual gloss after 10DR with 250 g applied weight: 79.8%

Residual gloss after 50DR with 250 g applied weight: 73.4% b)

using a four-path frame-type wet film applicator with a gap depth of 200 μm, was applied to a glass substrate. After the solvent had been flashed (15 minutes at room temperature, 20 minutes at 80° C.), the film was exposed with 1900 mJ/cm$^2$ (high-pressure Hg lamp) at room temperature in an air atmosphere. Cured film:

Pendulum damping: 194 sec

Residual gloss after 10DR with 250 g applied weight: 65.6%

Residual gloss after 50DR with 250 g applied weight: 80.4% c)

using a four-path frame-type wet film applicator with a gap depth of 100 μm, was applied to a Bonder panel. After the solvent had been flashed (15 minutes at room temperature, 20 minutes at 80° C.), the film was exposed with 1900 mJ/cm$^2$ (high-pressure Hg lamp) at room temperature in a nitrogen atmosphere. Cured film:

Erichsen cupping: 1.2 mm d)

using a four-path frame-type wet film applicator with a gap depth of 100 μm, was applied to a Bonder panel. After the solvent had been flashed (15 minutes at room temperature, 20 minutes at 80° C.), the film was exposed with 1900 mJ/cm$^2$ (high-pressure Hg lamp) at room temperature in an air atmosphere. Cured film:

Erichsen cupping: 2.2 mm

A formulation of 70% by weight of melamine carbamate hydroxypropyl acrylate (prepared according to example 4), 30% by weight of HDDA and 4% of Irgacure® 184 was prepared and a)

using a four-path frame-type wet film applicator with a gap depth of 200 μm, was applied to a glass substrate. After the solvent had been flashed (15 minutes at room temperature, 20 minutes at 80° C.), the film was exposed with 1900 mJ/cm$^2$ (high-pressure Hg lamp) at room temperature in a nitrogen atmosphere. Cured film:

Pendulum damping: 196 sec

Residual gloss after 10DR with 250 g applied weight: 93.3%

Residual gloss after 50DR with 250 g applied weight: 81.1% b)

using a four-path frame-type wet film applicator with a gap depth of 200 μm, was applied to a glass substrate. After the solvent had been flashed (15 minutes at room temperature, 20 minutes at 80° C.), the film was exposed with 1900 mJ/cm$^2$ (high-pressure Hg lamp) at room temperature in an air atmosphere. Cured film:

Pendulum damping: 193 sec

Residual gloss after 10DR with 250 g applied weight: 63.8%

Residual gloss after 50DR with 250 g applied weight: 29.6% c)

using a four-path frame-type wet film applicator with a gap depth of 100 μm, was applied to a Bonder panel. After the solvent had been flashed (15 minutes at room temperature, 20 minutes at 80° C.), the film was exposed with 1900 mJ/cm² (high-pressure Hg lamp) at room temperature in a nitrogen atmosphere. Cured film:

Erichsen cupping: 1.1 mm d)

using a four-path frame-type wet film applicator with a gap depth of 100 μm, was applied to a Bonder panel. After the solvent had been flashed (15 minutes at room temperature, 20 minutes at 80° C.), the film was exposed with 1900 mJ/cm² (high-pressure Hg lamp) at room temperature in an air atmosphere. Cured film:

Erichsen cupping: 0.6 mm

A formulation of 50% by weight of melamine carbamate hydroxypropyl acrylate (prepared according to example 4), 50% by weight of HDDA and 4% of Irgacure® 184 was prepared and a)

using a four-path frame-type wet film applicator with a gap depth of 200 μm, was applied to a glass substrate. After the solvent had been flashed (15 minutes at room temperature, 20 minutes at 80° C.), the film was exposed with 1900 mJ/cm² (high-pressure Hg lamp) at room temperature in a nitrogen atmosphere. Cured film:

Pendulum damping: 187 sec

Residual gloss after 10DR with 250 g applied weight: 94.2%

Residual gloss after 50DR with 250 g applied weight: 90.5% b)

using a four-path frame-type wet film applicator with a gap depth of 200 μm, was applied to a glass substrate. After the solvent had been flashed (15 minutes at room temperature, 20 minutes at 80° C.), the film was exposed with 1900 mJ/cm² (high-pressure Hg lamp) at room temperature in an air atmosphere. Cured film:

Pendulum damping: 186 sec

Residual gloss after 10DR with 250 g applied weight: 66.8%

Residual gloss after 50DR with 250 g applied weight: 39.0% c)

using a four-path frame-type wet film applicator with a gap depth of 100 μm, was applied to a Bonder panel. After the solvent had been flashed (15 minutes at room temperature, 20 minutes at 80° C.), the film was exposed with 1900 mJ/cm² (high-pressure Hg lamp) at room temperature in a nitrogen atmosphere. Cured film:

Erichsen cupping: 0.8 mm d)

using a four-path frame-type wet film applicator with a gap depth of 100 μm, was applied to a Bonder panel. After the solvent had been flashed (15 minutes at room temperature, 20 minutes at 80° C.), the film was exposed with 1900 mJ/cm² (high-pressure Hg lamp) at room temperature in an air atmosphere. Cured film:

Erichsen cupping: 1.0 mm

The invention claimed is:

1. A radiation-curable compound obtained by a process comprising reacting at least one melamine-formaldehyde resin with at least one compound of the formula (I),

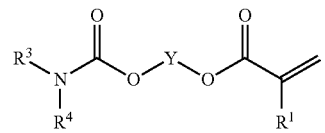

in which $R^3$ and $R^4$ independently of one another are hydrogen, $C_1$-$C_{18}$ alkyl, $C_6$-$C_{12}$ aryl or $C_5$-$C_{1-2}$ cycloalkyl, Y is selected from 1,2-ethylene, 1,2-propylene, 1,1-dimethyl-1,2-ethylene, 1-hydroxymethyl-1,2-ethylene, 2-hydroxy-1,3-propylene, 1,3-propylene, 1,4-butylene, 1,6-hexylene, 2-methyl-1,3-propylene, 2-ethyl-1,3-propylene, 2,2-dimethyl-1,3-propylene, and 2,2-dimethyl-1,4-butylene, or

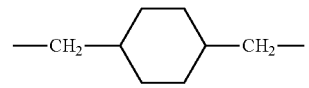

or 1,2-, 1,3- or 1,4-cyclohexylene, $R^1$ is hydrogen or methyl, preferably hydrogen, with the proviso that at least one of the radicals $R^3$ and $R^4$ is hydrogen.

2. A compound according to claim 1, wherein Y is 1,2-ethylene, 1,2-propylene or 1,3-propylene.

3. A compound according to claim 1, wherein $R^3$ and $R^4$ are hydrogen.

4. A compound according to claim 1, wherein the melamine-formaldehyde resin is a compound of the formula Mel-N$_3$ FA$_{fA}$ R$^5_{mA}$ H$_{6-fA}$ in which Mel-N$_3$ is a melamine radical formed by imaginary abstraction of the six hydrogen atoms attached to the amino groups in melamine, FA is a group —CH$_2$—O—, $R^5$ is a $C_1$-$C_8$ alkyl group, $f_A$ can adopt any desired values from 3.6 to a maximum of 6.0, and $m_A$ can be values from at least 2.0 to $f_A$.

5. A compound according to claim 4, wherein $R^5$ is selected from the group consisting of methyl, ethyl, and butyl.

6. A coating composition comprising at least one radiation-curable compound according to claim 1, optionally, at least one reactive diluent, optionally, at least one solvent, optionally, further, typical coatings additives, and at least one photoinitiator.

7. A primer, surfacer, pigmented topcoat material or clearcoat material in the field of automotive refinish, large-vehicle finishing or aircraft, comprising the coating material of claim 6.

8. A process for preparing a compound according to claim 1, which comprises reacting at least one melamine-formaldehyde resin with at least one (meth)acrylate bearing carbamate groups, at acidic pH.

9. The process according to claim 8, wherein the reaction is conducted in the presence of at least one reactive diluent.

* * * * *